United States Patent Office 3,154,824
Patented Nov. 3, 1964

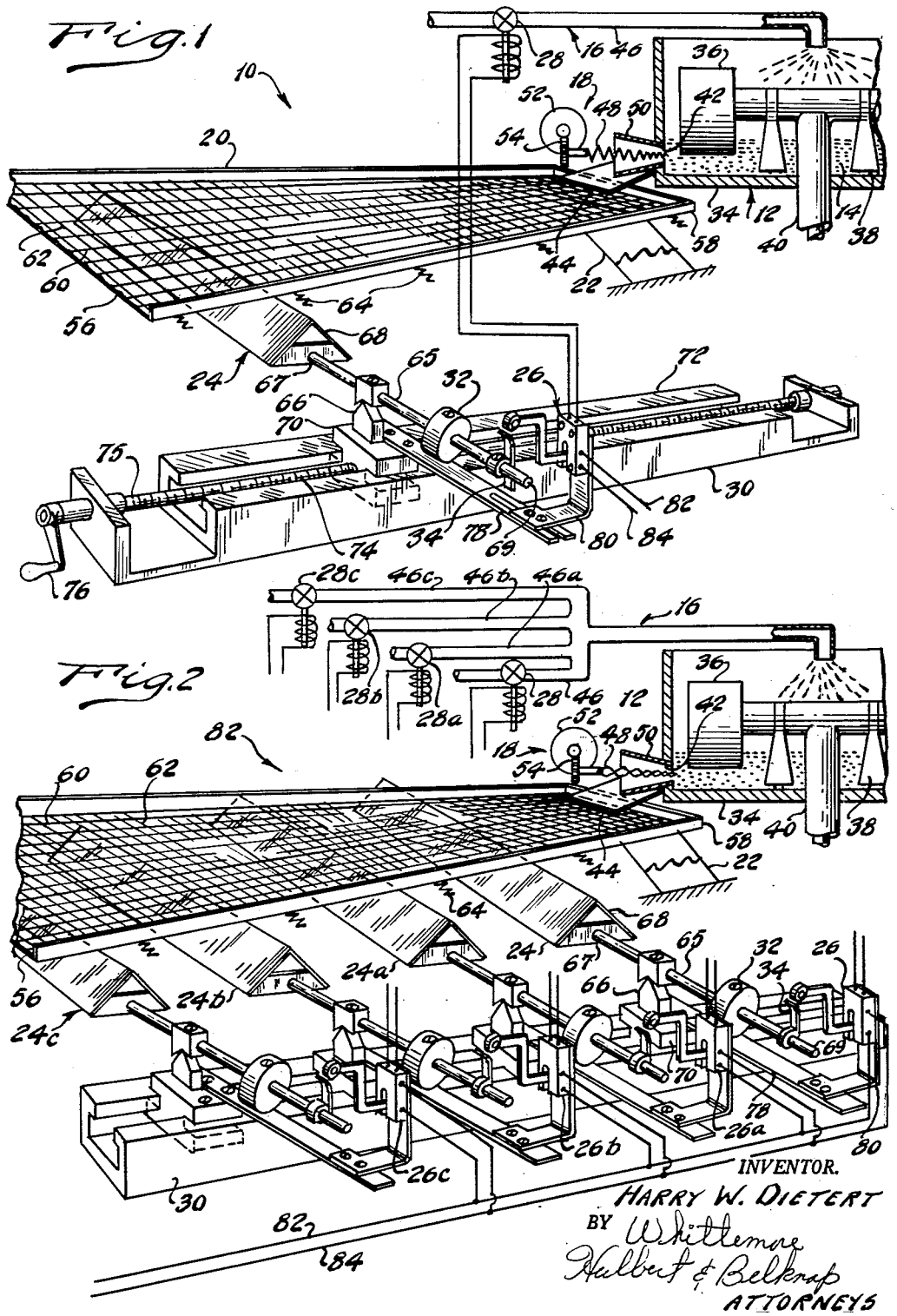

3,154,824
MOLDABILITY CONTROLLER
Harry W. Dietert, Kerrville, Tex., assignor to Harry W. Dietert Co., Detroit, Mich., a corporation of Michigan
Filed Aug. 21, 1961, Ser. No. 132,904
21 Claims. (Cl. 22—89)

The invention relates to material conditioning and refers more specifically to apparatus for controlling the moldability of granular material such as foundry sand.

Apparatus affording direct control of an ultimate property of granular material, such as moldability of foundry sand as defined in the commonly owned patent application, Serial No. 83,074, filed January 16, 1961, now Patent No. 3,136,009, granted June 9, 1964, are preferred over apparatus which attempt to control the ultimate property of a granular material through measurement and control of a single constituent of the granular material, since more accurate and reliable control of the ultimate property of the granular material is possible by controlling the ultimate property directly. However, prior apparatus for such direct control of an ultimate property of granular material are deficient in that they are not versatile enough to control the ultimate property of the granular material over a sufficiently wide variation in the ultimate property.

Further with prior apparatus for directly controlling the moldability of granular material the control has often been inaccurate and unreliable due to the fact that the separating means such as vibrating screens used therein and the chutes by which samples of granular material are transferred to the separating means have been at an unregulated temperature. Thus the chutes and separating means have in the past caused more or less condensation of vapor in samples of granular material on contact therewith thereby increasing the moisture content of a sample of granular material over that of the granular material from which the sample was taken and decreasing the moldability thereof.

Also in prior apparatus for controlling the moldability of granular material wherein the granular material has been mixed with an additive in a muller and samples thereof have been fed from the muller onto separating means, the means for feeding the granular material from the muller to the separating means have often have been incapable of providing a substantially steady flow of sample granular material which is desirable in conjunction with some types of automatic moldability controllers.

It is therefore one of the objects of the present invention to provide apparatus for controlling the moldability of granular material over an increased range of moldability.

Another object is to provide apparatus for controlling the moldability of granular material including a muller for mixing the granular material and an additive, means for removing the granular material from the muller and for transferring it to a vibrating screen which screen has graduated openings therein in the direction of travel of granular material thereacross on vibration thereof and balance means positioned beneath the screen operable to actuate a valve to halt addition of additive to the muller on the granular material in the muller reaching a predetermined moldability.

Another object is to provide moldability controller apparatus as set forth above wherein the balance has a part that is adjustable beneath the screen in the direction of travel of granular material over the screen and the balance is adjustable separately to vary the moldability of a sample of granular material required to cause actuation of the valve with the balance in a fixed position beneath the screen.

Another object is to provide moldability controller apparatus as set forth above including a plurality of balances positioned beneath the screen operable to separately cause closing of a plurality of solenoid operated valves to reduce the additive supplied to the muller in steps.

Another object is to provide apparatus as set forth above wherein the means for transferring the granular material from the muller to the screen and the screen are heated to prevent condensation of vapor in a sample of granular material on contact therewith.

Another object is to provide a separating screen for a moldability controller or similar device which screen has openings therein that are progressively larger toward one end thereof.

Another object is to provide a resilient, helical, motor driven, auger inserted in an opening in a container for removing granular material through the opening in the container in conjunction with a tapered flange around said opening.

Another object is to provide moldability controller apparatus which is simple in construction, economical to manufacture and efficient in use.

Other objects and features of the invention will become apparent as the description proceeds, especially when taken in conjunction with the accompanying drawing, illustrating a preferred embodiment of the invention, wherein:

FIGURE 1 is a diagrammatic representation partly in perspective and partly in section of moldability controller apparatus constructed in accordance with the invention.

FIGURE 2 is a diagrammatic representation partly in perspective and partly in section of a modification of the moldability controller apparatus illustrated in FIGURE 1.

With reference to the figures one embodiment of the invention will now be disclosed.

The moldability controller apparatus 10 illustrated in FIGURE 1 includes the muller 12 for mixing granular material 14 with an additive supplied thereto by the additive supply means 16 and transfer means 18 for positively removing a substantially constant sample of the granular material 14 from the muller 12 and passing it to the separating screen 20. The separating screen 20 and vibrator 22 are also included as part of the moldability controller apparatus 10 along with the adjustable balance 24, switch 26 and solenoid operated valve 28.

In operation a continuous sample of granular material 14 from muller 12 is fed over vibrating screen 20. When the sample of granular material fed over screen 20 reaches a predetermined moldability it will fall through the screen 20 onto the balance 24 to actuate switch 26, close valve 28 and cause the addition of additive to the muller 12 to stop. The moldability of the sample of granular material when the switch 26 is actuated may be varied by moving the balance 24 along the support 30 or by moving the counterweight 32 of the balance 24.

More specifically the muller 12 includes the container 34 in which the granular material 14 and an additive are mixed by the action of the rollers 36 and scrapers 38 on rotation of the rotatable shaft 40. The muller 12 further includes the opening 42 therein through which a substantially constant sample of the mixed granular material is fed to the chute 44.

The additive supply means 16 includes the pipe 46 through which an additive such as water is passed to the container 34 from an additive reservoir (not shown). The solenoid actuated valve 28 is positioned in the pipe 46 and is operable to stop the flow of additive therethrough on actuation thereof.

The transfer means 18 includes the previously mentioned chute 44 and the spring wire auger 48. As shown in FIGURE 1 the spring wire auger 48 is inserted in the opening 42 in the container 34 and is surrounded by the outwardly flared flange 50 secured to the container about the periphery of opening 42.

Thus on operation of the motor 52 to which the auger 48 is secured by means of the worm and worm gear combination 54 a substantially constant volume of granular material is withdrawn from the container 34 and deposited on the separating screen 20. The outwardly tapered flange 50 is provided about the opening 42 in the container 34 to relieve the spring wire auger and prevents binding thereof which might otherwise occur.

The separator screen 20 is wider at the end 56 thereof than it is at the end 58 on which the sample of granular material is deposited. The longitudinally extending separating memers 60 are therefore wider apart at the end 56 than they are at the end 58 since there is the same number at both ends of screen 20. Similarly the transversely extending separating members 62 of the screen 20 are spaced wider apart progressively toward the end 56 of the separating screen 20.

Thus as a sample of granular material positioned on the separating screen 20 at the end 58 thereof is moved toward the end 56 due to the motion imparted to the separating screen 20 by the vibrating feeder 22, the granular material will fall through the screen at a position along the length of the screen 20 determined by the moldability of the sample of granular material. The moldability of the sample of granular material is controlled by balance 24, switch 26 and solenoid operated valve 28 in accordance with the position along the screen at which the granular material falls through the screen in a manner to be considered subsequently.

Such control of the moldability of the granular material in the container 34 will be accurate, however, only if water vapor present in the granular material 14 in the container 34 is not condensed as the sample of granular material contacts the chute 44 and the separating screen 20. Thus, the chute 44 and the separating screen 20 in accordance with the invention are heated by heating elements 64 positioned along the length of the screen 20 and the chute 44 to maintain the temperature of the screen and chute at approximately 140° F. Such temperature is sufficient to prevent condensation of the water vapor in a sample of granular material deposited thereon which would occur if the chute and screen were too cold.

The balance 24 as shown in FIGURE 1 comprises a balance beam 65 fulcrumed on the pivot means 66 having the elongated inverted V-shaped member 68 secured to end 67 thereof and positioned beneath the separating screen 20 and the adjustable counterweight 32 and switch actuating cam 34 secured to the other end 69. The pivot means 66 is secured to an H-shaped block 70 which is movable in the channel guide member 72 by means of the axially fixed, rotatable, elongated screw 74 passing therethrough and crank 76 secured to the end 75 of screw 74. Switch 26 is mounted on the H-shaped block 70 by means of support 78 and the bracket 80 adjustably secured to the support 78 as shown in FIGURE 1.

In operation when the weight of the sand falling on the inverted V-shaped member 68 of the balance 24 is greater than the weight of the counterweight 32, the switch actuating cam 34 is moved in an up direction as shown in FIGURE 1 and the switch 26 is actuated to close an electric circuit through electrical conductors 82 and 84 to energize the solenoid actuated valve 28 and halt the addition of additive to the granular material 14 in the muller 12.

Thus it will be seen that since the openings in the operating screen 20 are graduated so that they are larger as the end 56 of the screen 20 is approached that in operation additive will be added to the granular material 14 until the sample taken therefrom and placed on the screen 20 has a low enough moldability to remain on the screen 20 until the openings over the balance 24 are reached thereby. Thus moldability of the granular material in the muller 12 may be automatically controlled.

In addition it will be noted that the moldability of the granular material passing through the screen 20 at which the switch 26 is actuated may be varied over a great range by moving the balance 24 axially of the screw 74. Further the moldability of the granular material 14 at which valve 28 stops the addition of additive thereto, may additionally be varied over an even wider range by adjustment of the counterweight 32 of the balance 24 along balance beam 65.

The modification 82 of the moldability controller 10 shown in FIGURE 2 is similar to the moldability controller 10 illustrated in FIGURE 1. Therefore in the consideration of the modified moldability controller 82 the same reference characters will be used for similar elements.

The moldability controller 82 differs from the moldability controller 10 in that a plurality of balances 24, 24a, 24b, and 24c are provided at relatively fixed positions along the length of the separating screen 20. Each of these balances 24 is operably associated with a separate switch 26, 26a, 26b, or 26c which switch operates a separate solenoid actuated valve 28, 28a, 28b, or 28c to close different branches of the additive supply pipe 46, 46a, 46b and 46c.

Thus in operation of the moldability controller apparatus 82 the supply of additive to the granular material in the container 34 may be controlled in steps representative, for example, of dry granular material, dry side tempered granular material, light tempered granular material and tempered granular material in accordance with the terminology of the foundry trade.

The modified moldability controller 82 further differs slightly from the moldability controller 10 in that the transfer means 18 includes an auger which is constructed of twisted resilient flat stock as illustrated in FIGURE 2 to provide even more positive feed of granular material 14 from the container 34 onto the chute 44.

The drawings and the foregoing specification constitute a description of the improved moldability controller in such full, clear, concise and exact terms as to enable any person skilled in the art to practice the invention, the scope of which is indicated by the appended claims.

What I claim as my invention is:

1. Apparatus for controlling the moldability of granular material, comprising a muller for mixing the granular material and an additive, means for feeding an additive to the granular material, an elongated screen, one end of which is positioned adjacent the muller for receiving a sample of granular material therefrom, said screen having openings therein which are progressively larger from said one end of the screen to the other end thereof whereby portions of the sample of granular material received on said one end will fall through said screen at different positions therealong depending on the moldability thereof on being moved over said screen from one end to the other thereof, means for transferring a sample of granular material from the muller to said one end of the screen, means for feeding the sample of granular material over the screen from one end to the other thereof, balance means positioned beneath the screen which balance means is positioned responsive to the weight of the granular material passing through the screen at a predetermined position therealong and means operably associated with the means for feeding an additive to the granular material responsive to the position of the balance means for stopping the feeding of the additive to the granular material when the moldability of the sample of granular material is such that a predetermined weight of the sample of granular material falls through the screen at a predetermined position therealong.

2. Structure as claimed in claim 1 and further including means for heating the transfer means and screen to prevent condensation of vapor contained in the sample of granular material on contact therewith.

3. Structure as claimed in claim 1 wherein said screen comprises an elongated substantially flat structure tapered in width from one end to the other and having longitudinal and transverse members defining said progressively larger openings, there being the same number of said longitudinal members at one end of the screen as at the other.

4. Structure as claimed in claim 1 wherein the muller has an opening therein and said means for transferring a sample of granular material from the muller to said screen comprises a flared annular flange around the opening, a resilient auger extending into the muller through said annular flange and opening and means for rotating said auger.

5. Structure as claimed in claim 1 wherein the means for stopping the feeding of the additive to the granular material comprises a solenoid actuated valve in the means for feeding the additive to the granular material, an electric circuit operable on completion to energize the solenoid actuated valve to stop feeding of additive to the granular material, a switch in said circuit operable on being closed to complete said circuit, and a balance having one end under said screen and the other end in operating relation to said switch whereby when a predetermined weight of granular material falls on said one end of the balance indicating a predetermined granular material moldability, said switch is closed by the other end of the balance and the valve is closed.

6. Structure as claimed in claim 5 and further including an adjustable counter weight on the other end of said balance whereby said predetermined weight may be varied.

7. Structure as claimed in claim 5 and further including means for adjusting said balance longitudinally of said screen to vary the moldability of the sample of granular material at the time of closing of said switch.

8. Structure as claimed in claim 5 and further including a plurality of other similar solenoid actuated valves and separated means for feeding additive to the muller, separate electric switches and electric circuits associated with each of the plurality of valves, and a plurality of other balance means each associated with a separate valve, circuit and switch and having one end positioned at a different location under the screen along the length thereof operable to stop the feeding of additive to the granular material in steps.

9. Structure as claimed in claim 5 and further including means on said one end of said balance for intercepting but not retaining the granular material falling through the screen.

10. Structure as set forth in claim 9 wherein the means for intercepting but not retaining the granular material falling through said screen comprises a member having a sloping side facing the screen whereby granular material falling through the screen onto the member slides therefrom due to gravitational forces.

11. Transfer means for removing granular material or the like from a container through an opening in the container, comprising an annular flange around the opening in the container, a resilient auger extending through the annular flange into the container, and means for rotating the auger.

12. Structure as claimed in claim 11 wherein both the auger and the annular flange are increased in diameter outwardly of said opening in the container.

13. Structure as claimed in claim 12 wherein said auger comprises a straight, twisted flat strip.

14. Structure as claimed in claim 11 wherein said auger comprises a helical resilient wire.

15. Apparatus for controlling the moldability of granular material including means for adding an additive to and mixing an additive with the granular material including a container, a screen having progressively larger openings therethrough from one end to the other thereof positioned adjacent the container for receiving a sample of granular material from the muller, means for transferring a substantially continuous sample of granular material from the muller onto said one end of the screen, means for feeding the granular material from said one end of the screen toward the other, and means positioned beneath the screen at a predetermined position responsive to the weight of granular material falling through the screen at the predetermined position in a predetermined time for controlling the means for adding an additive to the granular material within the muller.

16. Structure as set forth in claim 15 wherein the means responsive to the weight of granular material falling through the screen includes a balance and means for moving the balance longitudinally of the screen.

17. Structure as set forth in claim 15 wherein said means responsive to the weight of granular material falling through said screen comprises a plurality of balances extending transversely of the screen in spaced apart relation to each other longitudinally of the screen.

18. Apparatus for controlling the moldability of granular material comprising a muller for mulling the granular material and an additive, a conduit for supplying the additive to the muller, a solenoid operated valve in the conduit operable on actuation to stop the supply of additive to the muller, an opening in said muller, means for withdrawing a substantially constant sample of granular material from the muller through the opening, a screen having progressively larger openings therethrough from one end to the other thereof positioned adjacent the muller with the one end thereof beneath the opening in the muller whereby the sample of granular material withdrawn from the muller is deposited on the one end of the screen, means for vibrating the screen to transfer the granular material deposited thereon from said one end of the screen toward the other end thereof, a centrally pivotally mounted balance one end of which is positioned under the screen, an adjustable counterweight variably positioned on the balance, a limit switch positioned adjacent said balance for actuation thereby on the balance moving into a predetermined position and an electric circuit connected to the limit switch for actuating the solenoid operated valve on closing of the limit switch and means for moving the balance and limit switch in their predetermned relationship longitudinally of the screen between the one end and the other thereof.

19. Structure as set forth in claim 18 wherein a plurality of conduits are provided for feeding additive to the granular material, a separate solenoid is provided in each conduit and separate balances and associated limit switches and electric circuits are provided in conjunction therewith, each of which balances is separately movable longitudinally of said screen to provide stopping of the addition of additive to the muller in separate stages.

20. Structure as set forth in claim 18 wherein the means for withdrawing the substantially constant sample of granular material from the muller comprises a resilient auger extending into the muller through the opening therein and means for rotating the resilient auger.

21. Apparatus for controlling the moldability of granular material comprising a muller for mulling the granular material and an additive, a plurality of conduits for supplying an additive to the muller, a separate solenoid operated valve in each of the conduits operable on sequential actuation thereof to stop the supply of additive to the muller in steps, an opening in said muller, an outwardly extending, radially outwardly diverging frusto-conical shield positioned about said opening and resilient auger means extending into said muller through said opening for withdrawing a substantially constant sample of granular material from the muller through the opening, a screen tapering so as to become progressively wider from one end to the other thereof including the same number of diverging longitudinal dividing members at both ends thereof and transverse dividing members spaced progressively further apart from the one end to the other end thereof to provide progressively larger openings through the screen from one end to the other thereof positioned adjacent the muller with the one end thereof beneath the opening in the muller whereby the sample of granular material withdrawn from the muller is deposited on the one end of the screen, means for vibrating the screen to transfer the granular material deposited thereon from said one end of the screen toward the other end thereof, an elongated track extending longitudinally of said screen at one side thereof, a plurality of pivot mounting means positioned in said track for movement longitudinally thereof, separate balance means positioned on each of the pivot mounting means one end of which is positioned under the screen, a movable weight on the other end of the balance means and inclined plane means positioned on the one end of the balance means for transiently receiving thereon granular material passing through said screen at predetermined locations, a separate limit switch positioned adjacent said other end of each of said balance means for actuation thereby on the balance means associated therewith moving into a predetermined position in accordance with the weight of granular material falling on the inclined plane means and an electric circuit connected to each of the limit switches for actuating a separate one of said solenoid operated valves on actuation of the limit switch.

References Cited in the file of this patent

UNITED STATES PATENTS

| | | |
|---|---|---|
| 151,911 | Reagan | June 9, 1874 |
| 729,395 | Niemann | May 26, 1903 |
| 798,382 | Allard | Aug. 29, 1905 |
| 1,017,506 | Burch | Feb. 13, 1912 |
| 2,063,266 | Pape et al. | Dec. 8, 1936 |
| 2,189,711 | Eigenbrot | Feb. 6, 1940 |
| 2,433,936 | Tornberg | Jan. 6, 1948 |
| 2,751,646 | Mann | June 26, 1956 |
| 2,782,926 | Saxe | Feb. 26, 1957 |
| 2,854,714 | Dietert | Oct. 7, 1958 |
| 2,969,567 | Ferris et al. | Jan. 31, 1961 |
| 3,037,759 | Smith | June 5, 1962 |
| 3,136,010 | Dietert et al. | June 9, 1964 |

FOREIGN PATENTS

| | | |
|---|---|---|
| 43,404 | France | Mar. 5, 1934 |

OTHER REFERENCES

"Elements of Chemical Engineering," by Badger & McCabe, 2nd edition, 1936, pages 560–563 relied on. Published by McGraw-Hill Book Co., New York.